United States Patent [19]

Bierleutgeb

[11] Patent Number: 4,935,612
[45] Date of Patent: Jun. 19, 1990

[54] AUTOFOCUS SYSTEM AND METHOD OF USING THE SAME

[75] Inventor: Fritz Bierleutgeb, Vienna, Austria

[73] Assignee: Reichert Jung Optische Werks, A.G., Vienna, Austria

[21] Appl. No.: 272,644

[22] Filed: Nov. 17, 1988

Related U.S. Application Data

[63] Continuation-in-part of Ser. No. 50,267, May 14, 1987, Pat. No. 4,803,352.

[51] Int. Cl.$^5$ ............................................. G01J 1/20
[52] U.S. Cl. .................................. 250/201.2; 350/519
[58] Field of Search ............ 250/201 AF, 201 R, 204; 354/406–408; 350/507, 518, 519, 521, 522

[56] References Cited

U.S. PATENT DOCUMENTS

| | | | |
|---|---|---|---|
| 4,595,829 | 6/1986 | Neümann et al. | 250/201 AF |
| 4,609,814 | 9/1986 | Nobuaki et al. | 250/201 AF |
| 4,620,089 | 10/1986 | Schlichting et al. | 250/201 AF |
| 4,639,587 | 1/1987 | Chadwick et al. | 250/201 AF |
| 4,687,913 | 8/1987 | Chaban | 250/201 AF |
| 4,694,151 | 9/1987 | Yoshimura | 250/201 PF |
| 4,803,352 | 2/1989 | Bierleutgeb | 250/201 R |

Primary Examiner—David C. Nelms
Assistant Examiner—Stephone B. Allen
Attorney, Agent, or Firm—Bean, Kauffman & Spencer

[57] ABSTRACT

A microscope with continuously or discontinuously variable objective magnification is provided with an autofocus system whose beam path passes through the objective and is directed out of the imaging beam path of the microscope between objective and eye piece to at least one photo-electric detector means. At least one optical system is located or locatable in the beam path of the autofocus system which allows or causes the at least one image formed on the detector means to be altered in scale when a change in the objective magnification occurs. The at least one optical system can be a zoom system or a series of lenses or fixed lens systems arranged to be inserted into the beam path of the focusing system. When the objective or objective magnification is changed, a coupling mechanism serves to appropriately vary the focal length of the at least one optical system located or locatable in the beam path of the autofocus system. Furthermore, a pattern comprising a light/dark contrast is projected into the object plane. This ensures in incident light operations that the system is optimally focused even with low contrast objects.

22 Claims, 4 Drawing Sheets

AUTOFOCUS SYSTEM AND METHOD OF USING THE SAME

This application is a continuation-in-part of my copending application Ser. No. 50,267, filed May 14, 1987 now U.S. Pat. No. 4.803,352 issued Feb. 7, 1989.

BACKGROUND OF THE INVENTION

The invention relates to an improved method for autofocusing a microscope with continuously or incrementally variable objective magnification and microscope systems that utilize the improved method.

In conducting inspections using a microscope, it is often necessary to be able to quickly change magnifications, whereby use is made of objectives having magnifying powers which vary over a wide range, for example, from 5x to 150x and above. Microscopes are widely used for supervising production processes, i.e., for routine examinations, for example, in the production of wafers, and visual focusing is extremely tiresome for the microscope operator. Increasing efforts have been made to employ autofocusing systems which make it possible to quickly focus automatically on the object and, in some instances, also more exactly than is visually possible. However, it has been found that conventional autofocus systems—in particular, when a radiation is used which ensures that the semi-conductor wafer under examination will not be damaged or changed—are not satisfactory in performance when the objective magnification varies over a wide range as noted above. For one, this is due to the fact that the structures inherent in the object or generated on the object get blurred with respect to edge contrast as the objective magnification increases. Accurate focusing deteriorates if this contrast, or a function derived therefrom, such as the value of high spatial frequencies, is used as the focusing criterion. The applicant has found that a further problem resides in the fact that the image-side depth of focus increases as the magnification increases, i.e., it increases by the square of the objective magnification. This fact, no doubt, contributes to a considerable extent to the sometimes inexplicable failure of conventional autofocus systems at different magnifications. For this reason, the applicant has provided a method for autofocusing a microscope and a microscope with autofocus system, which are described in German patent application No. P 37 07 487.4 and U.S. application Ser. No. 50,267, filed May 14, 1987. Said method and microscope ensure reliable and optimal automatic focus adjustments even when the objective magnifications are very different from each other. It has been found that this way of autofocusing is fully satisfactory so long as sufficient details are visible on the object. In particular, in incident light microscopy it is often necessary to focus on object areas having very little detail (e.g., wafers in a first coating stage in the electronics industry) or, in extreme cases, even to focus on pure front-surface mirrors.

Even if sufficient details are visible at a high magnification, rapid movement of the object stage causes the image to shift too quickly through the optimum focus to be perceived by the electronics as sharp or unsharp.

BRIEF DESCRIPTION OF THE INVENTION

It is therefore the object of the present invention to improve the above-described autofocus system such that reliable focusing is ensured when using incident light microscopy, even with objects which have very little variation in detail. The pattern projected onto the object produces an image there which is reflected and used for focus adjustments. The term "signals" used in the present application embraces both optical and electric signals. In the autofocusing system of the present invention, there are at first optical signals generated which are subsequently converted into electric signals by electro-optical transducers. These electric signals can be further processed electronically and, after having been further processed, yield at least one control signal which is capable of causing the object and/or objective to be moved in the direction of optimum focus in a manner well known in the art, for example, via appropriate electric motors and drives.

Preferably, the pattern is arranged in a plane conjugated to the object plane and is illuminated from behind. It is advantageous for the pattern to be a line pattern or cross-line grid. It is appropriate if the pattern is reflected into the system by a semi-reflecting mirror or a prism located in the imaging beam path. The illumination of the pattern is switched on only when the object and objective are moved relative to each other. This is to prevent the image of the pattern superimposed on the object in the eyepiece of the microscope from causing a disturbing effect, in particular in dark field illumination operations. In order to illuminate the pattern and to effect autofocusing it is also possible to use light of a specific wavelength range which is filtered out again in the imaging beam path in front of the eyepiece and/or a recording means, the optical system, however, being corrected for this wavelength range. It is particularly appropriate if the light used for illuminating the pattern is in a wavelength range outside that used for imaging, and, in order to compensate for the resulting focus shift, to shift the pattern, or a lens system imaging said pattern, to a predetermined position, dependent on the microscope objective used, which position compensates for the wavelength-dependent focus shift.

Alternatively, the illumination of the pattern utilizes polarized light, which is filtered out in the imaging beam path in front of the eye piece and/or a recording means by means of a complementary polarization filter.

In a particularly preferred embodiment of the present invention, optical means are provided to compensate for variations in the signals caused by a change in the objective magnification. These optical means adjust the optical signals prior to their conversion into electric signals. As an alternative or in addition to this, electronic means can be employed to compensate for the variations in the signals caused by a change in the objective magnification after conversion of the optical signals. These electronic means influence or process the electric signals, such as gradation amplifications or shifts in frequency behavior of electric filters, integrator circuits, etc. In practice, it was, however, found that the optical means perform satisfactorily. In a particularly preferred embodiment of the method of the present invention, the optical signals are two separate images of the object which are formed on two separate electro-optical transducers or on separate portions of one single electro-optical transducer. The focal planes formed as a result of back projections from said transducers or said portions of said one transducer receiving said images are separate from each other, one lying in front of the plane of focus of the object and the other behind the plane of focus of the object. The particular advantage of this method resides in the fact that it is equally suitable for use in incident and transmitted light microscopy. It is advantageous for the optical means to be lenses or lens systems which cause the image generated by the objective to be altered in scale in the formation of the optical signals and, in particular, scale down said image in order to increase the contrast and to decrease the image plane depth of focus. In a variant of the method of the present invention, the scale alteration is effected step by step in that, for example, a lens or lens system associated with the objective used in each case in inserted into the focusing beam path. Said lenses or lens system may be arranged, for example, in a turret.

According to the preferred practice of the invention, scale alteration is, however, effected continuously by means of a zoom lens system arranged in the beam path of the focusing system. As a result, the objective magnification can be compensated for at least to such an extent that the disadvantageous influence caused by the increase in the image-side depth of focus can be eliminated and the flattening of the edge contrast occurring as a result of high magnifications is reduced to such an extent that a comparison of the reference signals used for focusing yields a reliable distinguishing criterion.

It is appropriate for the scale alteration to be effected automatically and coupled with the change in the objective magnification. Manual adjustment is, however, also possible and might become necessary in case of weak image contrast in order to sample out a contrast portion able to be processed by the autofocus system.

In the practice of the method of the invention it was found to be particularly useful for the scale alteration to be effected after the optical signals have been deflected out of the microscope's imaging beam path, so as not to adversely affect the latter. It was found to be particularly appropriate for the optical means used to effect the scale alteration to be effective prior to the division into two separate signals. It was furthermore found particularly suitable for the optical signals to be balanced as to image size and brightness prior to the formation of separate images, at least when the system is in a position of optimum focus, i.e., images of equal size and brightness are formed when the system is in a position of optimum focus, which is normally not necessarily so due to the different scale ratios and different number of reflections or glass surfaces to be passed through. These measures can easily be implemented by using simple positive and negative lens systems and neutral grey filters arranged in one of the beam paths.

If the two signals used for focusing have been balanced in such a way, the brightness of both images is particularly suitable for being utilized for coarse focusing adjustments, a criterion which is, for example, also effective when the back projections of both images into the object area do not embrace the actual focal plane.

At least for fine focusing adjustments, use is made of the signal contents corresponding to a range of high spatial frequencies which can be extracted optically by appropriate grids or electrically by appropriate filters. At least one TV recording means is preferably used as electro-optical transducer. It is advantageous for the separate images to be represented adjacent to each other on at least one TV screen. This makes it possible to monitor the focusing operation and to determine whether an area of the object has been chosen which is suitable for autofocusing purposes, i.e., whether it is a high-contrast area of the object which has been chosen, on the basis of which it appears advisable to shift the object or to effect a scale alteration in the autofocus system.

According to a further practice of the method of the present invention, differently scaled partial images of the object are imaged on a detector means adjacent to or overlapping each other, the evaluation electronics causing the focus adjustment on the basis of the most suitable spatial frequency range obtainable from the partial images.

The microscope of the invention ensures that reliable and exact automatic focusing can be effected not only with highly varying objective magnifications but also with weak object contrasts. The light illuminating the pattern preferably has a specific wavelength range or a selective color filter is arranged in front of the pattern and a complementary color filter is arranged in the imaging beam path in front of the eye piece and/or a recording means, e.g., a still picture camera, a video camera or a film camera. Preferably, a long-wavelength cut-off filter is therefore arranged in front of the pattern, seen in the direction of light propagation, and a corresponding short-wavelength cut-off filter is arranged in the imaging beam path in front of the eye piece and/or a recording means. Alternatively, a polarization filter can be arranged in front of the pattern, seen in the direction of light propagation, and a complementary polarization filter is arranged in the imaging beam path in front of the eye piece and/or the recording means.

It was found to be appropriate for the grid, or a lens which images said grid, to be arranged for vertical movement along the projection beam path and to be operatively connected with an adjusting device which shifts the grid dependent on the microscope objective in use. The optical system which causes the scale alteration in the autofocus system preferably comprises a zoom system which may, however, theoretically be substituted for by a series of lenses or lens systems independently insertable into the beam path, which lenses or lens systems may be arranged in a turret. Appropriately, a coupling mechanism is provided which, when the objective or the objective magnification is changed, causes the focal length of the at least one optical system inserted or insertable into the beam path of the autofocus system to be varied accordingly. Readjustment operations which might become necessary, in particular in case of poor contrasts, are particularly easy to perform when the coupling mechanism effects a basic setting for the focal length of the at least one optical system for each given objective magnification and, besides that, permits manual adjustment of the focal length.

According to a constructionally particularly simple embodiment of a microscope with incident light and/or transmitted light illumination and two detector means arranged such that their back projections caused by the optical trains of the autofocus system and the objective lie in separate focal planes in the vicinity of the plane of focus of the object, the optical system for effecting scale alterations of the images formed of the object on the detector means is located or locatable in an area along the focusing beam path, through which area the beams leading to the two detector means jointly pass. In an alternative embodiment of this microscope, one optical system for scaling the images formed of the object on the detector means is located or locatable in each of the beam portions leading separately to the respective detector means. The two optical systems associated with the detector means may be differently designed. Preferably, they are arranged such that they simultaneously ensure a balance in brightness and/or size when the system is in focus. In a particularly preferred embodiment of the invention, a beam splitter is positioned in the imaging beam path of the microscope in such a manner that an intermediate image is formed of the object by the focusing beam deflected by said beam splitter. This intermediate image is scaled by the at least one optical system and imaged, either directly or via a further intermediate image, onto the detector means. It is advantageous to position a collimator in front of said optical system in such a manner that it images the pupil of the microscope objective into the pupil of the related optical system. Preferably, at least one TV recording means is used as detector means on which two contiguous, preferably adjacent, equally sized images of the object are formed which are both equally bright and equally blurred when the system is in a position of optimum focus. Electronic signal processing means are connected to the TV recording means for controlling the shift of the object stage and/or the microscope objective until the system is in a position of optimum focus. A viewing screen may be provided for monitoring the focusing operation.

If only one single TV recording means is used to receive both images, an electronic circuit with a differential amplifier is provided. After each scanning interval of the TV recording means, which interval is equal to the width of one of the images formed on the recording means, a switch then causes the, if appropriate, processed signal from the recording means to be applied to the respective other input of the differential amplifier.

The electronic circuit is moreover so laid out that variations in the signals caused by the relative movement of object and objective during focusing do not result in measuring results being falsified.

PREFERRED EMBODIMENTS

Figure 1:
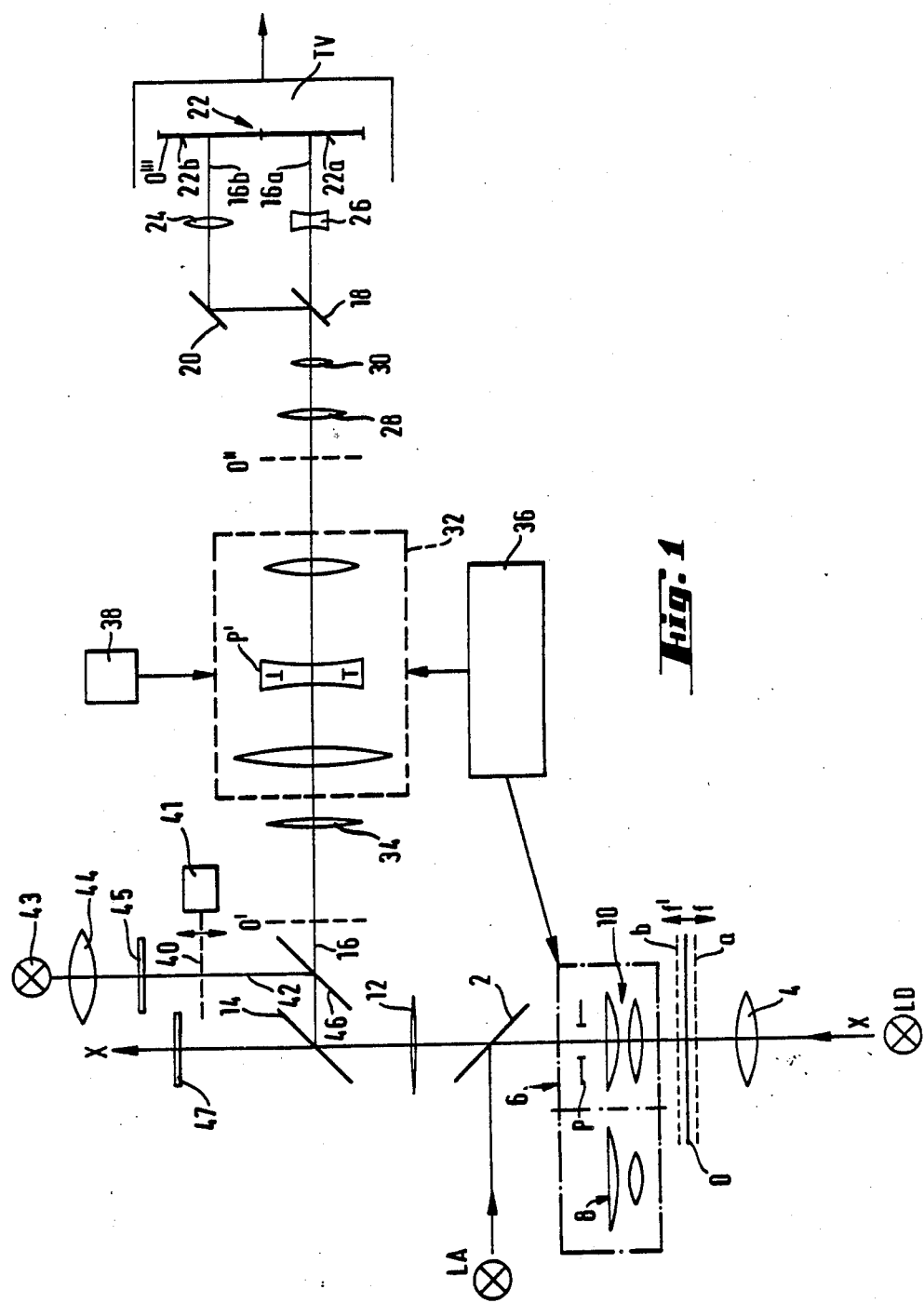
FIG. 1 schematically shows the beam path of the microscope with autofocus system according to the present invention.

FIG. 1 schematically shows the most important portions of the beam path of a microscope and its autofocus system. The optical axis of the microscope is designated by letters X—X. Letter O designates an object plane which is adjustable—as is indicated by arrows f-f'—along the optical axis X—X of the microscope. The microscope is designed for incident light and transmitted light microscopy. In incident light illumination, light emergent from a light source LA is directed onto a semi-reflecting mirror 2 which deflects the light into the beam path X—X. In transmitted light illumination, light emergent from a light source LD is likewise directed to object plane O after having passed through a condenser 4. A series of objectives having different magnifying powers are mounted in a lens turret 6 (represented only schematically) such that, when turret 6 is rotated, the individual objectives can be inserted successively into the beam path X—X. For reasons of clarity, only two objectives are shown, of which objective 10 is located in the beam path and objective 8 is not. Focusing is effected by shifting the object plane O in the direction of arrows f and f'. The pupil of objective 10 is designated by letter P. A tube lens 12 is located in the beam path extending from objective 10 to an eye piece or binocular tube (not shown). Located behind said tube lens 12 is a semi-reflecting mirror 14 deflecting a focusing beam out of the beam path X—X, the optical axis of said focusing beam being designated by reference numeral 16. Said focusing beam leads to a TV camera designated TV. The final portion of the beam path 16 in front of the TV camera is divided into two beam portions 16a and 16b by a divider mirror, beam portion 16b being deflected by a reflecting mirror 20 in such a way that it extends parallel to beam portion 16a. Both beam portions 16a and 16b are incident on a light-sensitive film 22 of the TV camera, the pick-up lens of which has been removed. Beam path portions 16a and 16b form two images 22a and 22b of an object located in the object plane O on the light-sensitive film 22 which defines image plane O'''. The arrangement is such that images 22a and 22b are as closely adjacent to each other as possible, but do not overlap. A focal plane a is obtained as a result of a back projection from the surface area of light-sensitive film 22 associated with image 22a into the object area, whereas a focal plane b is obtained as a result of a back projection from the surface area of the light-sensitive film 22 associated with image 22b. When the object plane O is in the focal plane a, the image formed of the object on light-sensitive area 22a of light-sensitive film 22 will be sharp, while the image on area 22b of light-sensitive film 22 will be blurred, and vice versa. In FIG. 1 the object plane is located centrally between focal planes a and b so that both images 22a and 22b are equally blurred, a lens 24 located in beam path portion 16b causing partial images 22a and 22b to be of equal size. Furthermore, a neutral grey filter 26 can be arranged in beam path portion 16a. This measure makes allowance for the fact that more light is absorbed along beam path portion 16b than along beam path portion 16a. As a result, the brightness of partial images 22a and 22b is balanced as well. As is evident from FIG. 1, the object is not imaged directly by focusing beam 16 onto areas 22a and 22b of light-sensitive film 22, but intermediate images are formed. In the present case two intermediate images O' and O'' are formed. Intermediate image O' is generated by objective 10 and tube lens 12. The size or scale of the image formed of the object at the intermediate image plane O' is dependent on the magnifying power of objective 10. The location of intermediate image O', however, remains unchanged. If lenses 28 and 30 positioned in front of beam splitter 18 were chosen such that they imaged an image of the object formed at the intermediate image plane O' onto light-sensitive film 22, the object details of the images formed on the light-sensitive areas 22a and 22b would be represented at different sizes dependent on the magnifying power of the objective chosen in each case. As already mentioned at the outset, such an image enlargement, on the one hand, results in a flattening of edge contrasts, i.e., a reduction in high spatial frequencies, which, for example, are to be used in a subsequent electronic control circuit as focusing criterion. On the other hand and as likewise set out before, the image-side depth of focus, i.e., the depth of focus in the area of the light-sensitive film 22, increases as the objective magnification increases, so that, for this reason, too, focusing becomes increasingly difficult. To counteract this, the intermediate image O' is imaged into a stationary second intermediate image plane O" by means of a zoom system 32 as well as—in the depicted embodiment—by a collimator 34. Collimator 34 causes parallel light to be guided to zoom system 32 and, furthermore, images pupil P of objective 10 into pupil P' of zoom system 32. Thus, a reduced image of the image of object 0 generated in enlarged size in intermediate image plane O' by objective 10 is formed in intermediate image plane O" by zoom system 32 and collimator 34. By an appropriate reduction in size, it is possible to form an image of the object O in the intermediate image plane O" which does not vary in size or varies only slightly, irrespective of the magnification of the objective in use. This can be accomplished by means of a coupling mechanism 36, which, when lens turret 6 is moved, automatically adjusts the focal length of zoom system 32, and thus its magnification or reduction effects, to corresponding basic settings, a manually operable actuator 38 being provided as well which permits the focal length of the zoom system 32 to be adjusted intentionally to other or additional settings. This might be desirable, for instance, if there are particularly weak object contrasts.

Examples of such basic settings are given in the following table:

| Magnification of microscope objective | Focal length of zoom system |
|---|---|
| 5×/10× | 80 mm |
| 20× | 60 mm |
| 50× | 30 mm |
| 100×/150× | 18 mm |

The collimator lens then has, for example, a focal length of 70 mm, lens 28 a focal length of 40 mm and lens 30 a focal length of 25 mm if two adjacent identical images are to be formed on a TV camera of ⅔".

Furthermore, FIG. 1 schematically shows how a pattern is reflected into the object plane O. The pattern of the depicted embodiment is a grid 40 which is connected with a motor drive 41 causing grid 40 to be moved along the optical axis of imaging beam path 42. The grid is arranged in a plane conjugated to the object plane O. It is illuminated by a lamp 43 via a collector 44 and a filter 45, reflected into the beam path by means of a semi-reflecting mirror 46 and projected into the object plane O via semi-reflecting mirror 14, lens 12 and the respective objective 8 of the lens turret. A filter 47, which is complementary as regards its wavelength transmission, is arranged in the observation beam path X—X. (If filter 45 is a long-wavelength cut-off filter, e.g., for 670 nm, filter 47 is a corresponding short-wavelength cut-off filter, e.g. for 670 nm). The use of filters 45 and 47 prevents the image of grid 40 generated on object 0 from being visible in the eye piece of the microscope.

If the filter wavelength of filter 45 is chosen to be in the infrared range, the same effect could be produced and filter 47 could be dispensed with. However, if the objectives are not corrected for infrared, as is usually the case, grid 40 will not be sharply imaged and, dependent on which objective 8 is in use, will assume different focus positions in the image plane O'''. This is compensated for by motor drive 41 which shifts grid 40, dependent on the respective objective 8 in use, along optical axis 42, for example, by means of a servo-element (not shown) actuated by an adjustment of the lens turret.

Figure 4:
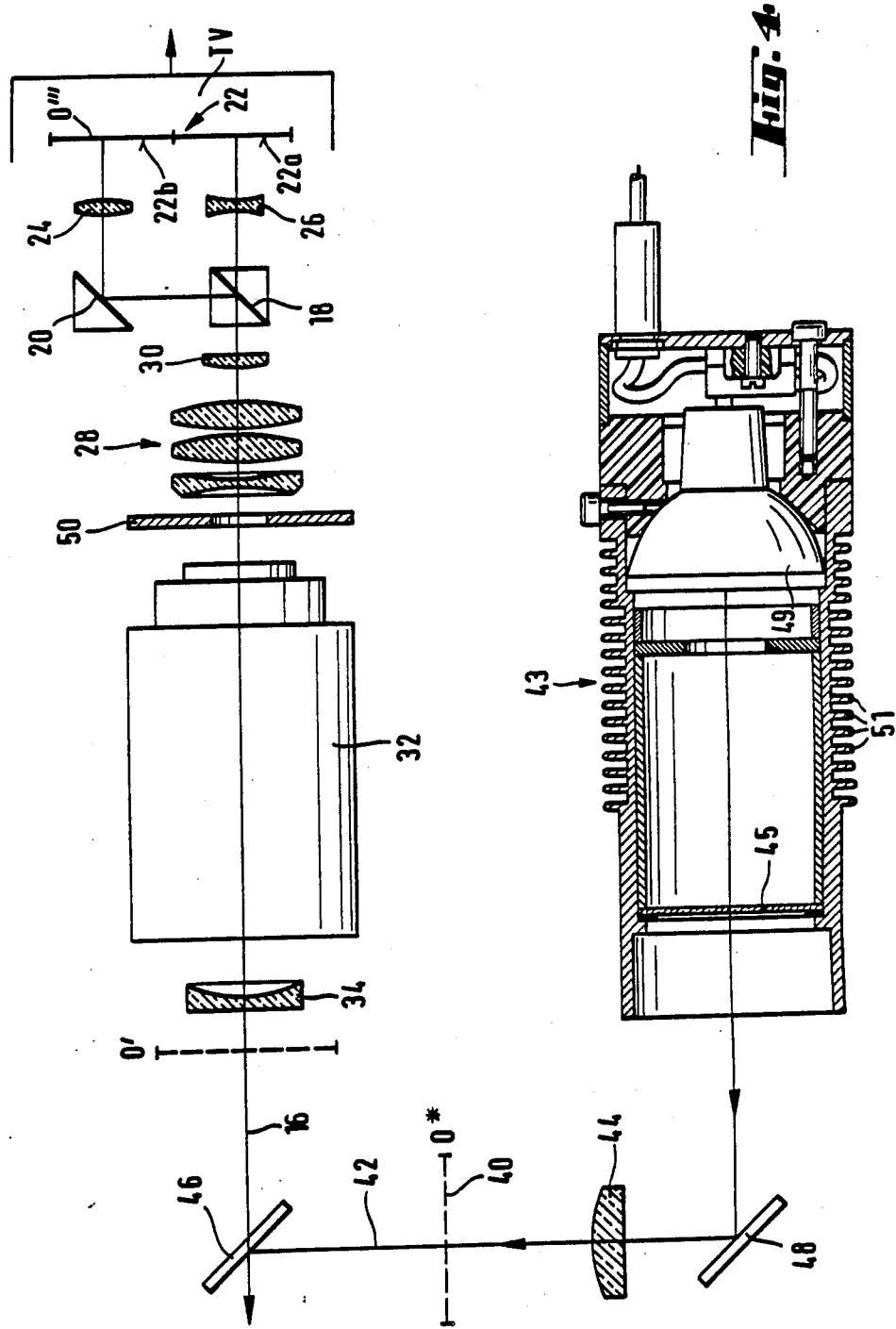
FIG. 4 is a detailed view of a portion of the beam path shown in FIG. 1 of a practical embodiment of the microscope of the invention.

The detailed, partially schematic view of FIG. 4 of the optical units used for autofocusing illustrates a practical embodiment of the invention. The elements which correspond to those shown in FIG. 1 are designated by the same reference signs. Besides that, an additional mirror 48 is shown which deflects the illumination light emergent from light source 43 onto grid 40 which is located in a plane O conjugated to the object plane. Moreover, a diaphragm stop 50 is shown which is arranged behind the zoom objective. Light source 43 comprises a reflector lamp 49 received in a lamp housing 51 having cooling ribs. Lamp housing 51 also holds filter 45. Complementary filter 47 located in the observation beam path is not shown in this view.

Figure 2:
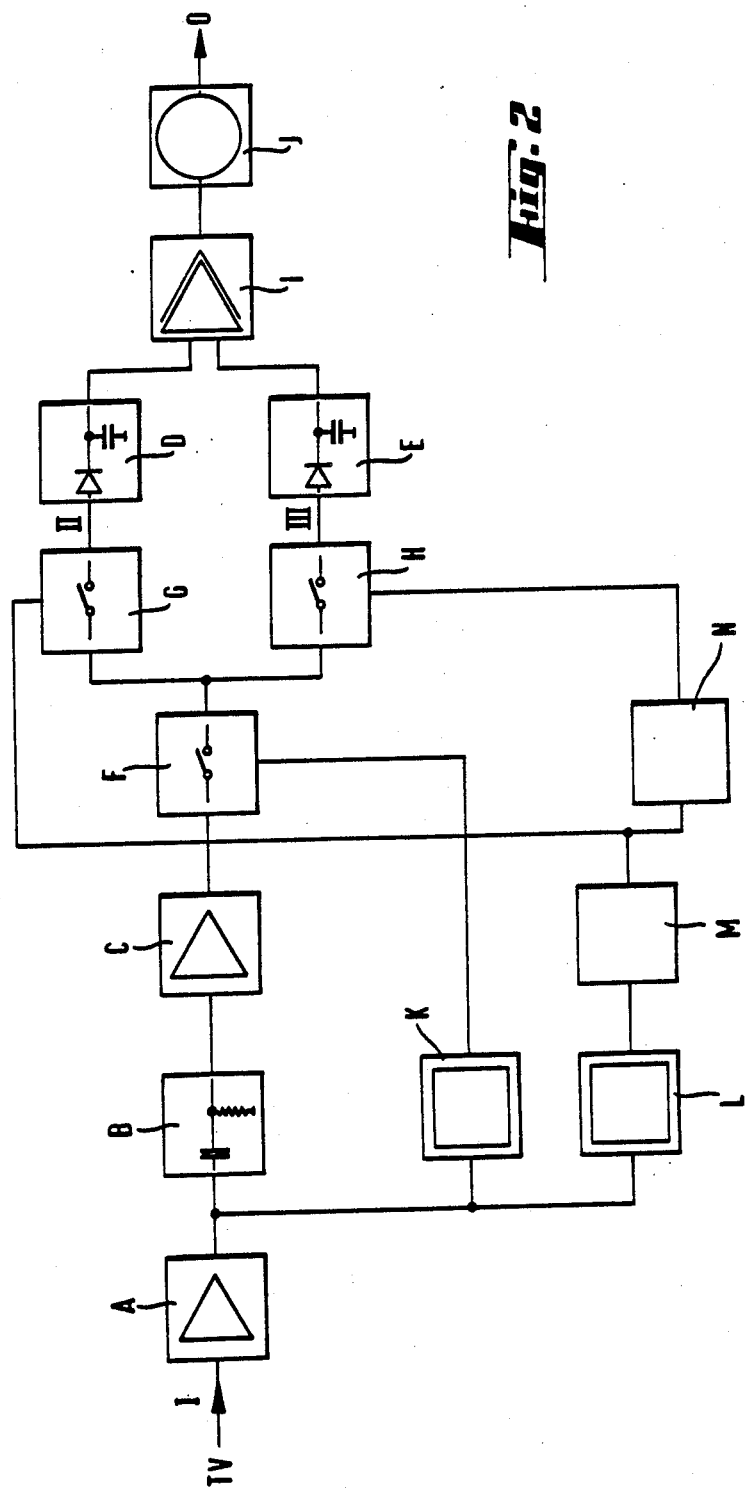
FIG. 2 shows an electronic circuit to be connected to the TV camera shown in FIG. 1.

Connected to the TV camera of FIG. 1 is, for example, the electronic circuit shown in FIG. 2. The output signal from the TV camera is applied to an input amplifier A and has the shape shown in plot I of FIG. 3 on the condition that the object plane is nearer to one of the two focal planes a, b than to the other. If one assumes that the object plane is nearer to the focal plane a, the image formed on light-sensitive area 22a is sharper than the image formed on light-sensitive area 22b. As a result, an electric signal as shown in plot I is derived from the scanning beam of the TV camera, which beam is guided over the entire width of the light-sensitive film 22. The harmonic content of said electric signal is very high as long as the scanning beam scans light-sensitive area 22a and very low when it scans light-sensitive area 22b. Such a scanning line is delimited on either side by horizontal synchronization signals which are likewise represented in plot I of FIG. 3.

A high-pass filter B is connected to input amplifier A allows preferably high-frequency vibrations to pass. A post-amplifier C is, in turn, connected to said high-pass filter. Two electronic switches G and H are connected in parallel to the electronic switch F. Two demodulators D and E are connected in series to said switches G and H. One of said demodulators is connected to the positive input and the other to the negative input of a differential power amplifier I whose output controls a servo-element J which adjusts object plane O. Between input amplifier A and high-pass filter B a branch line is provided which leads to a unit K for vertical synchronization recognition and whose output controls electronic switch F. Said unit K opens switch F as long as vertical synchronization pulses arrive and closes switch F the rest of the time during which the light-sensitive surface 22 is scanned, line by line, over both areas 22a and 22b until this area has been completely scanned. As a result, servo-motor J cannot be activated as long as vertical synchronization pulses arrive.

Between input amplifier A and high-pass filter B, there is furthermore provided a unit L for horizontal synchronization recognition. The output of unit L is applied to a single shot M whose output is, in turn, applied to electronic switch E and, via a further single shot N, to electronic switch H. Single shot M is activated via unit L each time a horizontal synchronization pulse arrives. Single shot M then closes electronic switch G over half the length of one scanning line, i.e., as long as the scanning beam scans area 22a of light-sensitive film 22, while electronic switch H is open, and triggers single shot N after a predetermined period of time has elapsed, electronic switch G being opened simultaneously. When single shot N has been activated switch H closes over the predetermined period of time, namely, over the period of time required to scan the second half of the scanning line over the width of area 22b of the light-sensitive film 22. The electric signals applied to demodulators D and E are therefore shaped as shown in plots II and III of FIG. 3.

The demodulators D and E output a direct current (d.c.) signal whose magnitude increases with the harmonic content in the electric signals applied to demodulators D and E. This means that in the present example the output signal from demodulator D is very high, whereas the output signal from demodulator E is very low. The d.c. signals from demodulators D and E practically do not change within one scanning line.

Figure 3A:
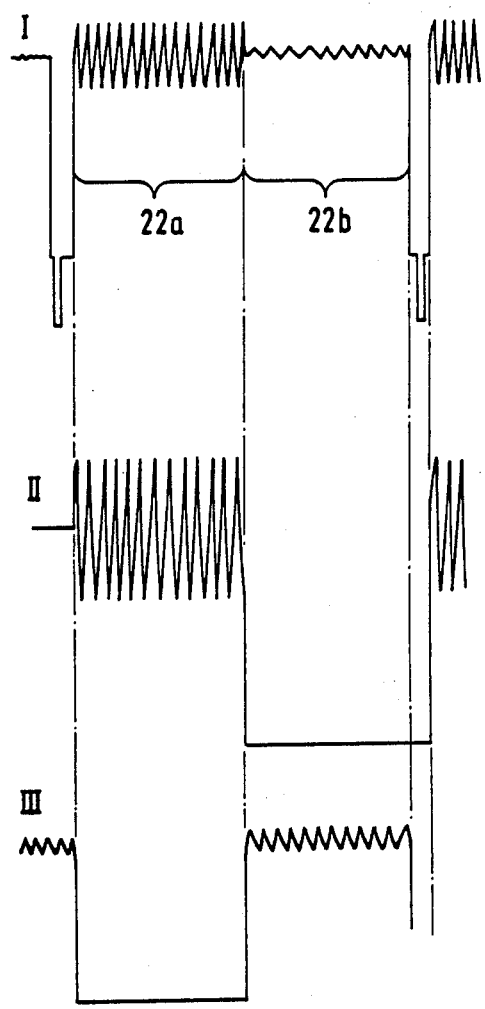
FIG. 3 shows signal plots derived from the circuit of FIG. 2.
Figure 3B:
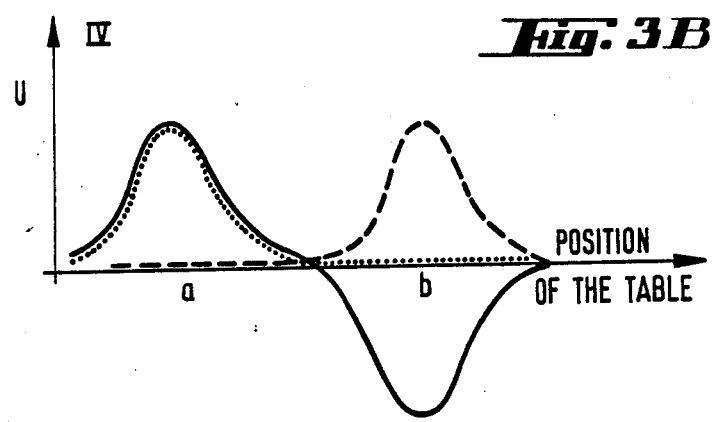

In plot IV of FIG. 3 the d.c. signal from demodulator D is represented by a dotted line and the d.c. signal from demodulator E by a dashed line, said signals being dependent on the position assumed by the object plane O. Focal planes a and b have been indicated as well. If, for example, object plane O lies in focal plane a, the d.c. signal from demodulator D reaches its maximum, while the d.c. signal from demodulator E reaches its minimum, which is practically zero. The opposite is true when the object plane lies in focal plane b. Power amplifier I then forms the difference signal between the voltage indicated in dotted outline and the voltage indicated in dashed outline. Here, it must be remembered that one voltage is applied to the positive input while the other voltage is applied to the negative input, which results in a reversal of polarity at the output of the power amplifier. This output voltage is indicated by the continuous line. The d.c. motor J which acts as servomotor and moves object plane O is now simply activated by this voltage. Servo-motor J will locate the position where the voltage curve indicated in continuous outline intersects the abscissa, which is exactly in the middle between focal plane a and b. The control loop is thus closed.

What is claimed is:

1. A method of autofocusing an incident light microscope having an objective and a plurality of magnifications of an object, which comprises projecting light producing a pattern image onto the object, separating a portion of the image-producing light including reflected pattern image light received through the objective from the object, generating two signals from said portion, each of said signals varying inversely to the other signal changing the size of the reflected pattern image to modify said signals when the magnification is change and controlling the microscope focus with said modified signals.

2. The method according to claim 1, wherein reflected pattern image light is filtered from the remainder of the image producing light.

3. The method according to claim 2, wherein said signals are modified by a zoom lens system.

4. The method according to claim 2, wherein said pattern image is projected through a color filter and the remainder of the image producing light is passed through a complementary filter.

5. The method according to claim 2, wherein said projecting light is outside the visible spectrum.

6. The method according to claim 5, further including compensating for the difference between the image producing light and the pattern producing light.

7. The method according to claim 6, wherein the pattern is moved to compensate for the difference.

8. An autofocusing system for a variable power incident light microscope having an imaging system, including an objective, for providing a magnified image from light received from an object, a focusing mechanism and means to direct a portion of the image-producing light from the objective to said autofocusing system, which comprises projection means for producing a pattern image on the object, the pattern image light being reflected with the image-producing light, a beam divider to direct said portion along two paths, imaging optics located on each path, electro-optical means to convert light from said imaging optics into two electrical signals, each of said signals having one characteristic varying inversely to the one characteristic of the other as the microscope focus changes, optical means to vary the size of the image on said electro-optical means and modify said signals when the magnification is changed, and control means to drive the focusing mechanism in response to said signal, whereby deleterious effects of changes in magnification; rapid scanning at high magnification or poor object contrast are reduced.

9. The system according to claim 8, wherein said optics include a zoom system.

10. The system according to claim 8, wherein the size of the image is maintained substantially constant as the magification is varied.

11. The system according to claim 8, wherein said projection means includes a color filter and the imaging system includes a complementary color filter.

12. The system according to claim 8, wherein said projection system includes a polarized filter and the imaging system includes a crossed polarized filter.

13. The system according to claim 8, wherein said projection system is temporarily disconnected when the object is in focus.

14. The system according to claim 8, wherein said pattern comprises one set of alternating parallel black lines separated by white bars.

15. The system according to claim 8, wherein said pattern comprises a plurality of light spots on a black background.

16. The system according to claim 8, wherein the light of said projection means has a chosen wavelength and the imaging system is not responsive to said chosen wavelength.

17. The system according to claim 14, wherein said pattern further includes another set of parallel black lines, said another set being perpendicular to said one set.

18. The system according to claim 15, wherein said plurality is organized in repeating parallel rows of round light spots.

19. The system according to claim 15, wherein said plurality is organized in alternating parallel rows of round light spots.

20. The system according to claim 16, wherein said chosen wavelength is outside the visible spectrum.

21. The system according to claim 20, wherein said chosen wavelength is in the near infrared and said projecting means compensates for said chosen wavelength.

22. The system according to claim 21, wherein said projecting means includes a pattern reticle and means to move said pattern reticle.

* * * * *